United States Patent
McNulty

(10) Patent No.: US 7,223,954 B2
(45) Date of Patent: May 29, 2007

(54) APPARATUS FOR ACCESSING AN ACTIVE PIXEL SENSOR ARRAY

(75) Inventor: Peter C. McNulty, Sandy Hook, CT (US)

(73) Assignee: Goodrich Corporation, Charlotte, NC (US)

( * ) Notice: Subject to any disclaimer, the term of this patent is extended or adjusted under 35 U.S.C. 154(b) by 187 days.

(21) Appl. No.: 10/770,642

(22) Filed: Feb. 3, 2004

(65) Prior Publication Data

US 2004/0155175 A1 Aug. 12, 2004

Related U.S. Application Data

(60) Provisional application No. 60/444,436, filed on Feb. 3, 2003.

(51) Int. Cl.
*H01L 27/00* (2006.01)

(52) U.S. Cl. .................................. 250/208.1; 348/302

(58) Field of Classification Search ................ 348/302, 348/308; 250/208.1
See application file for complete search history.

(56) References Cited

U.S. PATENT DOCUMENTS

| | | | |
|---|---|---|---|
| 5,260,557 A | 11/1993 | Kissh et al. .............. 250/203.6 |
| 5,262,871 A * | 11/1993 | Wilder et al. ................ 348/307 |
| 5,296,852 A * | 3/1994 | Rathi ......................... 340/933 |
| 5,841,126 A | 11/1998 | Fossum et al. ........... 250/208.1 |
| 6,509,927 B1 | 1/2003 | Prater et al. ................. 348/221 |
| 6,512,218 B1 * | 1/2003 | Canini et al. ............. 250/208.1 |
| 6,825,936 B2 * | 11/2004 | Metcalfe et al. ............. 356/602 |
| 2001/0040631 A1 | 11/2001 | Ewedemi et al. ............ 348/294 |
| 2001/0040635 A1 | 11/2001 | Fossum et al. .............. 348/308 |
| 2002/0074481 A1 * | 6/2002 | McGrath et al. .......... 250/208.1 |
| 2004/0041916 A1 | 3/2004 | Schibli ................... 348/207.99 |

FOREIGN PATENT DOCUMENTS

| | | |
|---|---|---|
| DE | 37 44 128 | 7/1989 |
| DE | 3744128 | 7/1989 |
| WO | WO 01/38825 | 5/2001 |
| WO | WO 02/073951 | 9/2002 |

\* cited by examiner

*Primary Examiner*—Thanh X. Luu
(74) *Attorney, Agent, or Firm*—Ohlandt, Greeley, Ruggiero & Perle, L.L.P.

(57) ABSTRACT

A circuit includes a decoder for receiving an address within an address space of a processor and for accessing a pixel in an active pixel sensor array based on the address. The decoder maps the active pixel sensor array to the address space. The circuit can also provide sequencing of these addresses such that a group of pixels can be read out without additional addressing from a processor. There is also provided a method of processing pixel imperfections in real time. Pixel integration can be programmed on any single pixel or group of pixels in the array as well as windowed readout. A method of target discrimination is also disclosed.

34 Claims, 11 Drawing Sheets

APPARATUS FOR ACCESSING AN ACTIVE PIXEL SENSOR ARRAY

CROSS-REFERENCE TO RELATED APPLICATIONS

The present application is claiming priority of U.S. Provisional Patent Application Ser. No. 60/444,436, filed on Feb. 3, 2003, the content of which is herein incorporated by reference.

BACKGROUND OF THE INVENTION

1. Field of the Invention

The present invention relates to imaging technology, and more particularly, to a technique for accessing pixels in an active pixel sensor array. Embodiments of the invention may be used, for example, in cameras and in applications such as star tracking for satellite attitude control.

2. Description of the Related Art

A new image sensor technology is being developed as a successor to charge coupled device (CCD) technology. This new technology utilizes complementary metal oxide processing (CMOS) to construct an active pixel sensor (APS) that is responsive to light input over its field of view. An APS is an array of photosensitive elements known as pixels, each pixel possessing simple electrometers capable of converting photoelectric charge to an electrical current that can readily be measured. Each of the pixels can be accessed individually through various addressing schemes. This technology is contrasted to that of CCD technology where each photosensitive element transfers it's charge to the next element in a "bucket brigade" fashion until the charge reaches a common electrometer for the entire CCD that is capable of converting photoelectric charge to an electrical current.

Star tracking in the past has been accomplished by electronic imaging, typically using CCDs. However, future celestial tracking space navigation methods impose challenging requirements. Future host spacecraft should be smaller, have less mass, and require less power than present host spacecraft. Therefore, a list of features desired for future star tracking navigation devices includes miniaturization, small mass, and low power consumption. Radiation hardness, high fill factor, high sampling resolution, windowing (random access to pixels within a frame and programmable integration within windows), wide dynamic range (programmable integration time), and real time pixel access are also desirable in an imaging sensor.

U.S. patent application Publication No. U.S. 2001/0040631 A1 to Ewedemi et al. discloses a sensor array with a memory interface. Pixel data from the sensor array is stored in a local memory. An interface is coupled to the local memory and accesses the local memory for exporting the pixel data. The interface does not access the sensor array. The data is most current at a time of transfer of the data from the sensor array to the local memory, and the data ages after the transfer. Consequently, the pixel data may not be sufficiently current for some real-time processing applications.

SUMMARY OF THE INVENTION

There is a need for an apparatus that provides immediate access to data from an active pixel sensor array. Such an apparatus facilitates an interface for a microprocessor to directly map individual pixels of the active pixel sensor array as if the active pixel sensor array were a memory in the microprocessor's address space, without requiring specific memory interface protocols.

An embodiment of the present invention is a circuit that includes a decoder for receiving an address within an address space of a processor and for accessing a pixel in an active pixel sensor array based on the address. The decoder maps the active pixel sensor array to the address space.

Another embodiment of the present invention is an integrated circuit. The integrated circuit includes an active pixel sensor array, and a decoder for receiving an address within an address space of a processor and for accessing a pixel of the active pixel sensor array based on the address. The decoder maps the active pixel sensor array to the address space. Additionally, the integrated circuit may include a converter for representing a charge read from the pixel as a digital value.

There is also provided an interface that enables a processor to access a pixel circuit in the active pixel sensor array by direct memory access.

Another embodiment of the present invention is a system that includes an active pixel sensor array, a decoder for accessing a pixel of the active pixel sensor array based on an address, a converter for representing a charge read from the pixel as a digital value, and a microprocessor for providing the address and receiving the digital value. The address is within an address space of the microprocessor, and the decoder maps the active pixel sensor array to the address space.

The present invention takes APS technology another step by allowing not only individual addressing of pixels, but also integration control of a single pixel or a group (window) of pixels within the whole array. The present invention provides for a convenient method of addressing individual or groups (windows) of pixels in the array by a microprocessor or controller so the array is mapped in memory space.

DESCRIPTION OF THE INVENTION

Figure 1:
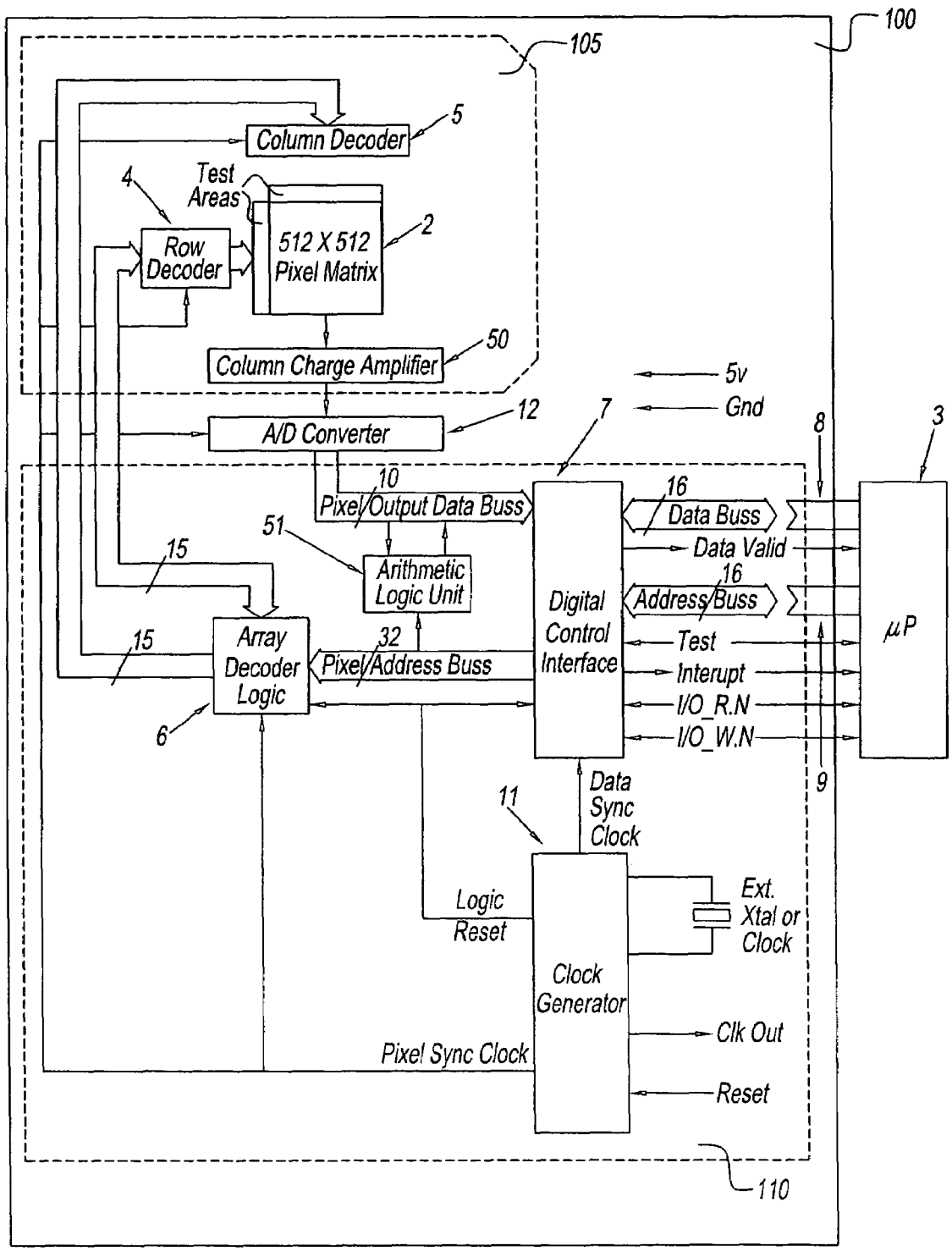
FIG. 1 is a block diagram of a random access imaging sensor in accordance with the present invention, shown as having a separate interface between an active pixel sensor array and a microprocessor.

FIG. 1 is a block diagram of an embodiment of a random access imaging sensor (RAIS) 100. RAIS 100 is a circuit that includes a RAIS interface 110, an analog-to-digital (A/D) converter 12 and an active pixel sensor array, i.e., sensor array 105. RAIS interface 110 is coupled to conventional data and address buses of an external processor, i.e., a microprocessor 3.

RAIS interface 110 maps sensor array 105 to an address space of microprocessor 3. Thus, RAIS interface 110 is an interface between microprocessor 3 and sensor array 105.

Sensor array 105 includes a pixel matrix 2, a row decoder 4, a column decoder 5 and a column charge amplifier 50. RAIS interface 110 includes an array decoder 6, an arithmetic logic unit 51, a digital control interface 7, and a clock generator 11.

Pixel matrix 2 contains a plurality of photosites or pixels for sensing optical images. Pixel matrix 2 is shown herein as an array of 512×512 pixels, but pixel matrix 2 may be of any desired dimension. The photosensitivity of pixel matrix 2 generates an electron charge proportional to photons incident on pixel matrix 2 and a quantum yield of a photosite 25 (see FIG. 2). Each pixel of pixel matrix 2 can be identified by its position in a row and a column of pixel matrix 2.

Row decoder 4 and column decoder 5 are a configuration of transistor switches that allow the charges on each pixel of pixel matrix 2 to be read out of pixel matrix 2. Column charge amplifier 50 amplifies the charges. A/D converter 12 receives the amplified charges from charge amplifier 50, converts the charges, and represents the charges as digital values. Individual pixels and groups or sub frames of pixels of pixel matrix 2 can be accessed at random through row decoder 4 and column decoder 5. This is accomplished by providing individual pixel reset and readout addresses for rows and columns of pixel matrix 2.

Digital control interface 7 receives an address from microprocessor 3 and passes the address to array decoder logic 6. Array decoder logic 6 accesses a pixel in sensor array 105 based on the address. More specifically, array decoder logic 6 converts the address into a row signal and a column signal that designate a position of a pixel in sensor array 105.

If necessary, digital control interface 7 reformats the address from microprocessor 3 for use by array decoder logic 6. For example, in the embodiment of RAIS 100 shown in FIG. 1, digital control interface 7 receives two 16-bit address words from microprocessor 3, and reformats the two 16-bit address words into a 32-bit address for array decoder logic 6. In this example, array decoder logic 6 converts the 32-bit address into a row signal and a column signal that designate a position of a pixel in sensor array 105.

Array decoder logic 6 drives row decoder 4 and column decoder 5, and provides proper sequencing of row decoder 4 and column decoder 5 based on output signals generated by digital control interface 7 in response to instructions from microprocessor 3. Clock generator 11 provides a synchronous clock signal for interfacing with microprocessor 3, and also synchronizes a logic reset, which returns all circuitry in RAIS interface 110 to a known condition.

RAIS 100 may be implemented with sensor array 105 and RAIS interface 110 being discrete from one another, as shown in FIG. 1, or as an integrated circuit on a single monolithic semiconductor. Also, the components of RAIS 100 may be configured of subordinate modules that operate collectively to provide the functionality described herein.

Figure 2:
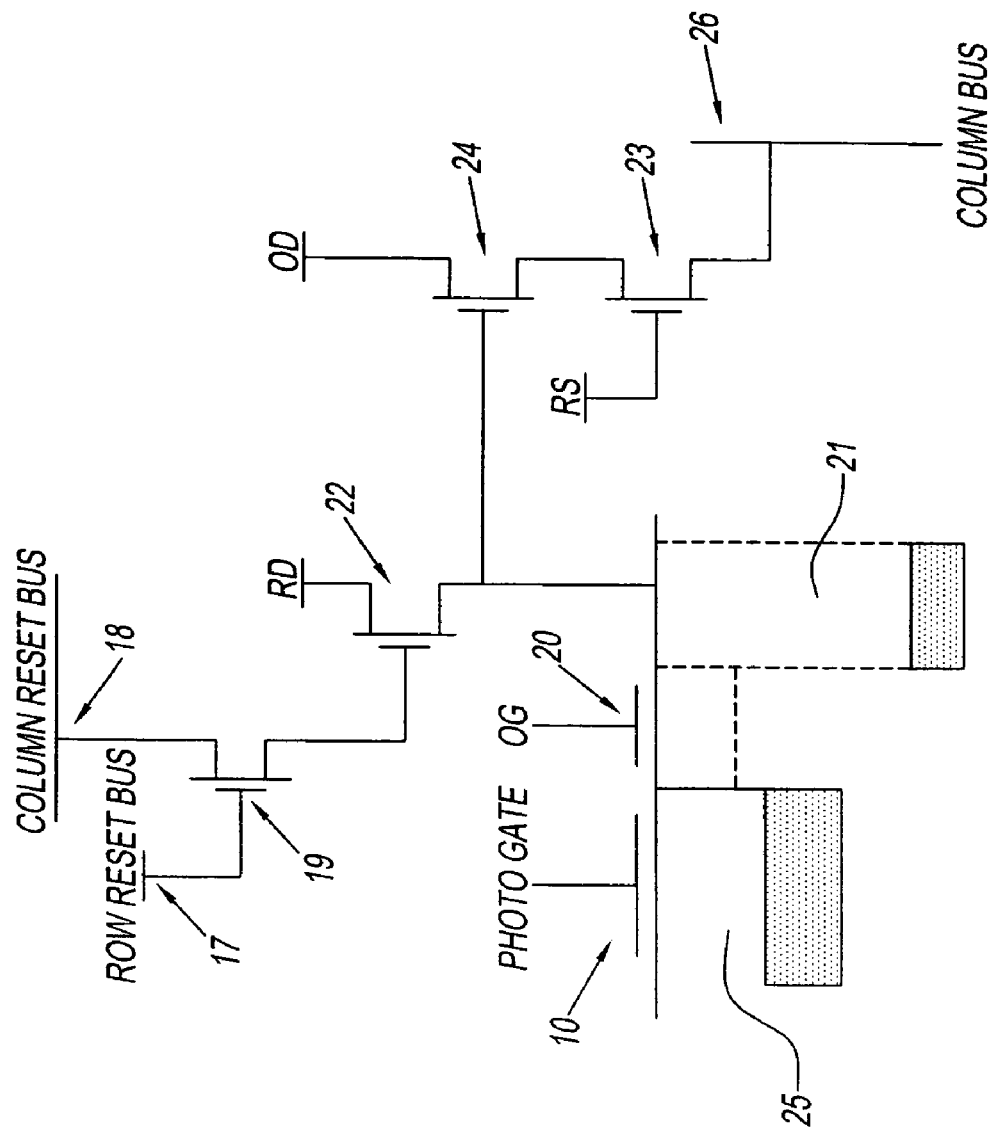
FIG. 2 is a schematic circuit diagram of an active pixel sensor, for a pixel in the sensor array of FIG. 1, with a photogate over a charge collection well that controls integration time.
Figure 3:
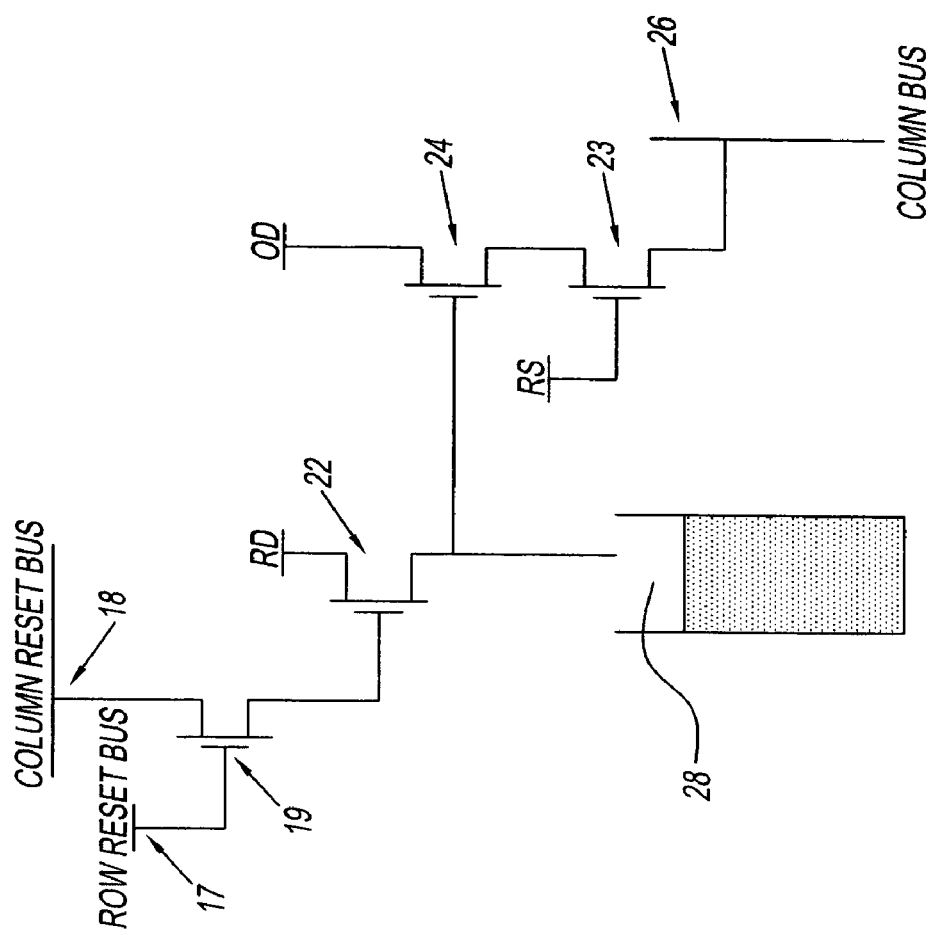
FIG. 3 is a schematic circuit diagram of an active pixel sensor, for a pixel in the sensor array of FIG. 1, that uses a photodiode as a charge collector.

FIGS. 2 and 3 are schematic circuit diagrams of exemplary embodiments of an active pixel of pixel matrix 2 configured with complementary metal oxide semiconductor (CMOS) devices. FIG. 2 shows an active pixel sensor with a photogate over a charge collection well that controls integration time. FIG. 3 shows an active pixel sensor that uses a photodiode as a charge collector.

Referring to FIG. 2, photosite 25 is a photosensitive pixel area controlled by changing a voltage applied to a photo gate 10. Photoelectric charge that is collected in photosite 25 can be metered per a discrete time interval. Control of the charge collected under photo gate 10 permits variable integration control of an optical input and is especially useful in scenes with widely varying light levels.

FIG. 2 also shows an output gate, i.e., OG 20, that limits the charge in the pixel of the channel at photosite 25. A floating diffusion 21 includes a source body diode diffusion parasitic capacitance of a reset transistor 22 and a stray layout capacitance. Reset transistor 22 is switched by another transistor, namely transistor 19. Control voltages applied at a row reset bus 17 and a column reset bus 18 cause reset transistor 22 to become active.

Transistor 19 is selected during pixel initialization to turn on reset transistor 22 and remove the charge collected on floating diffusion 21 from a previous read of pixel charge, thus resetting the pixel. This method of resetting the pixel is known as a destructive readout and is selectable through row reset bus 17 and column reset bus 18. Reset transistor 22 can affect a single pixel or any number of pixels by the selection of control voltages of row and column reset buses 17 and 18.

FIG. 3 illustrates a photodiode charge collection pixel. Here charge is collected in a photodiode 28 and is reset in a similar method as described above. Transistor 19 is selected during pixel initialization to turn on reset transistor 22 and remove the charge collected on photodiode 28 from a previous read of pixel charge, thus resetting the pixel. This method of resetting the pixel is selectable through row reset bus 17 and column reset bus 18. Reset transistor 22 can affect a single pixel or any number of pixels by the selection of control voltages of row and column reset buses 17 and 18.

Referring again to FIG. 2, during a readout operation of a pixel, the charge collected under photo gate 10 is transferred to floating diffusion 21. This is done by changing the voltage applied on photo gate 10 to cause inversion of photosite 25. This causes the charge to be attracted to floating diffusion 21 in such a way that the charge moves across OG 20 to floating diffusion 21.

Once the charge is resident at floating diffusion 21 the charge can then be transferred to column bus 26. Transistor 24 serves as a source follower to provide current gain of the signal for driving column bus 26. Transistor 23 is turned on by application of the RS signal at its gate. This allows current to flow through transistors 24 and 23 to transporting the signal proportional to the charge at the floating diffusion 21, to the column bus 26.

In a similar fashion, FIG. 3 illustrates transport of charge to the column bus. Here the photodiode 28 accumulates charge and a voltage proportional to the charge on photodiode 28 is transported to column bus 26 when RS is applied to transistor 23.

Each pixel in the pixel matrix 2 is connected to a column bus 26 in like fashion. RS is selected for all pixels in a row simultaneously, thereby placing charge from all pixels in that row on the column bus simultaneously. The voltage placed on each column bus 26 can be read out at that time through the column charge amplifiers 50, or a given pixel may not be reset and charge integration can continue until a later time when there is sufficient signal to warrant readout of that pixel. In other words, the sequence for each pixel is to reset the pixel, then integrate, readout the pixel to the column bus 26, and finally reset the pixel again to begin the next integration period. Multiple readouts to the column bus 26 can be accomplished without resetting the pixel allowing other pixels in a row to be readout with shorter integration times.

For illustration, the operation and structure of RAIS 100 will be described in terms of tracking a moving image sensed by sensor array 105. This is typical of a star tracking application for satellite guidance.

Digital control interface 7 handles all communication with microprocessor 3. Digital control interface 7 provides digitally coded information from pixel matrix 2 to the address bus and data bus of microprocessor 3. For the exemplary embodiment shown in FIG. 1, digital control interface 7 includes a sixteen bit data bus 8 and a sixteen bit bi-directional address bus 9. Appropriate signals are generated by digital control interface 7 to prepare microprocessor 3 for receiving data. Such signals may include a data valid signal, which is on during data output at data bus 8, and an interrupt signal, which can be used to prepare microprocessor 3 for data transmission from pixel matrix 2.

Array decoder logic 6 translates the commands received by digital control interface 7 and provides addressing to the row 4 and column 5 decoders that is compatible with pixel matrix 2. Array decoder logic 6, when employed for moving target applications, operates in three basic modes, i.e., acquisition mode, tracking mode, and direct addressing mode.

Acquisition mode is used when a new target is being acquired. Array decoder logic 6 starts scanning rows in sequence from the top to the bottom of pixel matrix 2. The simultaneously extracted charges are added together to yield a sum that is compared to a threshold value to determine whether a target image is represented in the selected row.

Alternatively a high pass spatial filter (not shown) resides within digital control interface 7 and acts upon the data from pixel matrix 2 to remove background or offset from the data. Acquisition discrimination utilizing a high pass spatial filter is known in the art. An example of such a filter is described in U.S. Pat. No. 5,260,557, entitled "Method And Apparatus For Acquisition And Tracking Of Light Sources In A Transient Event Rich Environment", which is incorporated herein in its entirety. A threshold is then applied to the amplitude of the data. Any pixel data that exceeds the threshold set during acquisition mode is reported to microprocessor 3. Once this pixel data has exceeded the threshold, microprocessor 3 recognizes the data as a valid target and microprocessor 3 executes the track mode for this target.

In the track mode, microprocessor 3 provides a start address and an end address of a track window to RAIS interface 110. The start address and the end address, together, designates a portion of sensor array 105. RAIS 100 includes a module that receives the start address and the end address, and uses the start address and the end address to present a sequence of addresses that array decoder logic 6 uses to sequentially access a plurality of pixels in the portion. Such a module could be a component of either array decoder logic 6 or digital control interface 7, or yet another component RAIS interface 110 in addition to array decoder logic 6 and digital control interface 7. Nevertheless, array decoder logic 6 starts a row and column counter internally that causes row decoder 4 and column decoder 5 to increment from the start address to the end address for the track window. RAIS 100 is capable of handling multiple track windows. The pixel data from each of the row and column addresses within a valid track window are output to microprocessor 3 for data reduction.

Pixel matrix 2 may possess excessive offset or gain non-uniformity of individual pixels or columns that interfere with the acquisition or tracking as described above. Since each pixel of pixel matrix 2 has its own amplifier, there can be gain differences in the output signal from one pixel to another. Furthermore, these amplifiers can have offsets that vary from pixel to pixel. There can also be differences of the measured signal from column to column of the pixel matrix 2 that generate artificial signals. In some implementations of pixel matrix 2 these artifacts can become large relative to the electro-optical signal that is being measured at each pixel. Arithmetic logic unit 51 corrects errors relating to offset or gain non-uniformity of pixels.

Figure 4:
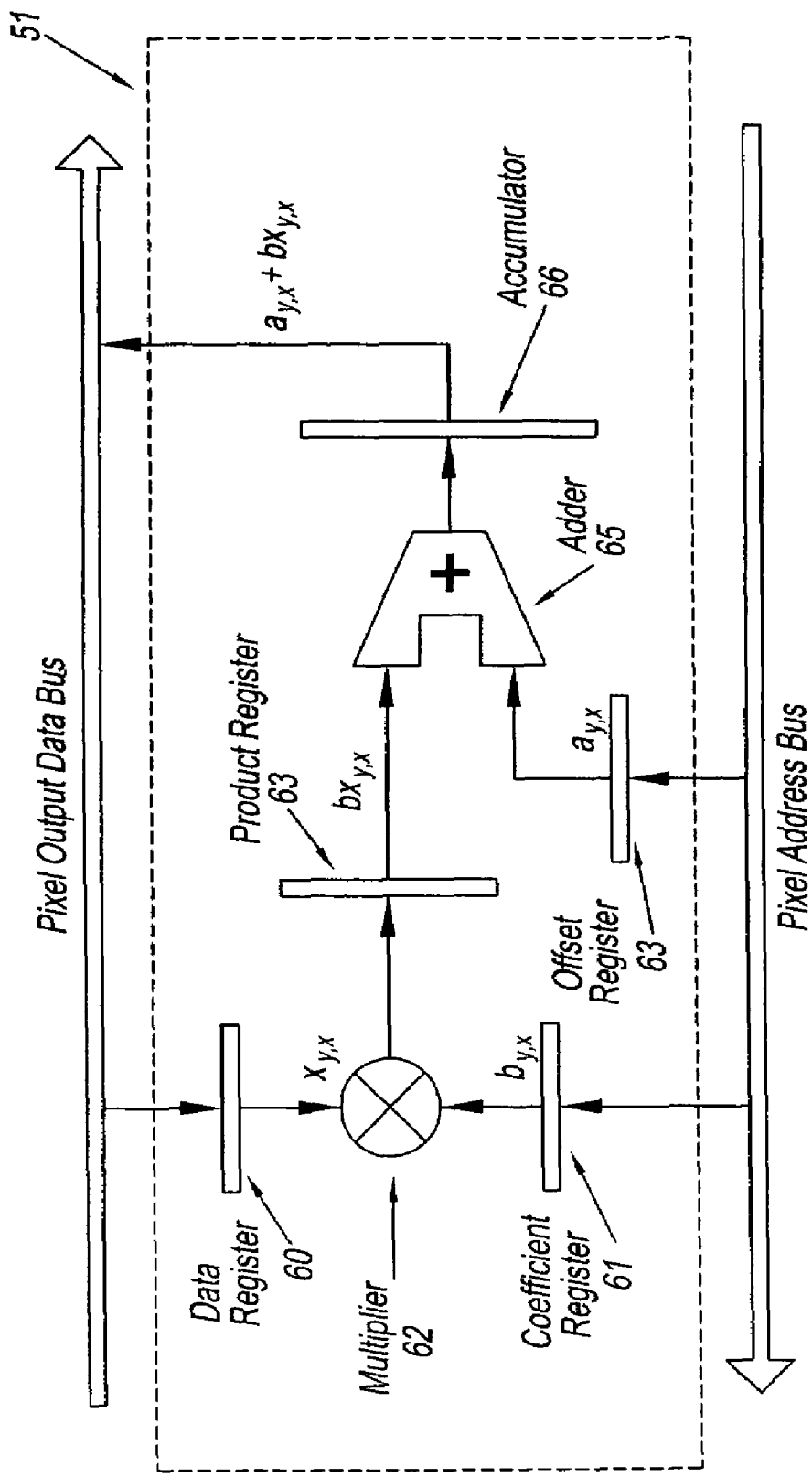
FIG. 4 is a block diagram of an arithmetic logic unit for correcting errors relating to offset or gain non-uniformity.

FIG. 4 is a block diagram of arithmetic logic unit 51. Arithmetic logic unit 51 corrects errors relating to offset or gain non-uniformity as the data is transferred back to microprocessor 3 through digital control interface 7. Arithmetic logic unit 51 includes a multiplier 62, an adder 65, an accumulator 66, a data register 60, a coefficient register 61, an offset register 64, and a product register 63.

Pixel data from pixel matrix 2 is run through arithmetic logic unit 51 before entering the digital control interface 7. The pixel data is buffered by data register 60. A coefficient value that is indexed by the pixel address is provided by microprocessor 3 for correcting the pixel gain, and is buffered in coefficient register 61. An offset value that is indexed by the pixel address is provided by microprocessor 3 interface for correcting the pixel offset and is buffered in offset register 64. Multiplier 62 takes the contents of data register 60 and the contents of coefficient register 61 and multiplies these values together producing a correction in gain that is stored in product register 63. This product is then advanced to adder 65 where the contents of offset register 64 is added to the value resident in product register 63. The sum of these two digital numbers is then stored in accumulator 66 and scaled to a desired precision. The output of accumulator 66 is indicated by the expression $a_{y,x}+bx_{y,x}$. Note that the expression uses subscripts y and x which correspond to the row decoder 4 and column decoder 5 values for the pixel being read out of pixel matrix 2. In this way, the pixel data is corrected in real time as it passes through RAIS 100.

Single pixel access is handled by the direct addressing mode. Here the digital control interface 7 receives a y (row) and an x (column) address for a single pixel from microprocessor 3. Array decoder logic 6 applies the x and y components of the address to row decoder 4 and column decoder 5, respectively, for this address only, and only data from the single pixel that corresponds to the address is returned to microprocessor 3 through the digital control interface 7. This method is used to control readout or integration of single pixels.

Row decoder 4 and column decoder 5 can be used in conjunction to reset individual pixels as well. To perform the Reset function, the RAIS 100 employs column reset 18 and row reset 17 buses (see FIG. 2). When column reset 18 is selected, all row reset transistors 19 in a selected column have a bias placed on the drain diffusions. This permits row reset transistors 19 to switch the bias onto the gate of reset transistors 22 in a selected row. In this way the integration time of individual photosites 25 can be controlled independently of other photosites 25 in a given row or column, thus allowing windowed integration time.

In one embodiment of the present invention a windowed readout is handled in array decoder logic 6 by state machine logic with a fixed integration time. Up to six windows can be provided for tracking six different targets, such as six stars. This minimizes the amount of data being processed by focusing only on specific regions of interest. Desired window addresses for each of the six windows are passed by microprocessor 3 to RAIS 100.

Figure 5:
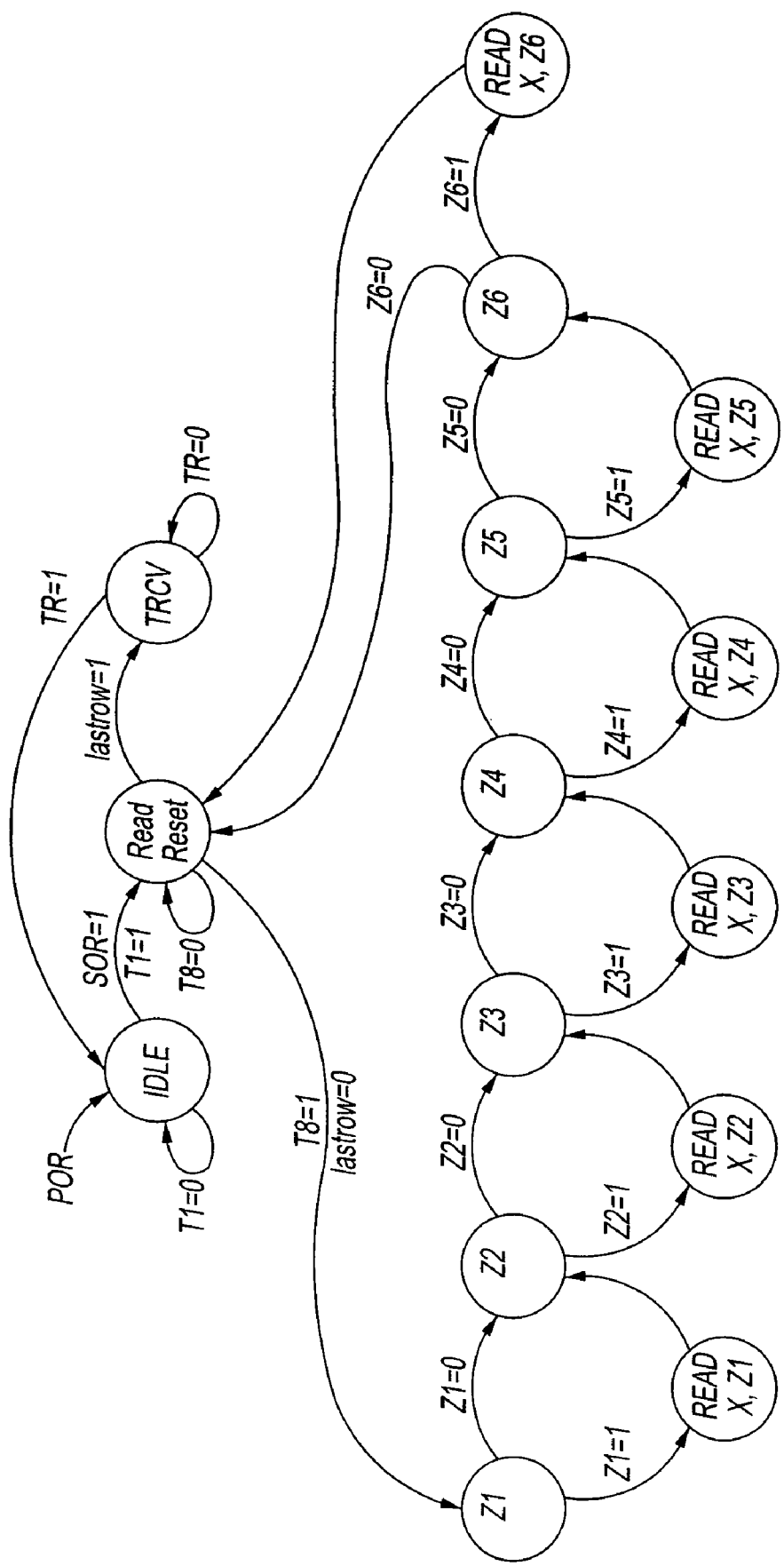
FIG. 5 is a state diagram of array decoder logic used during windowing operations in accordance with the present invention.

FIG. 5 is a state diagram of array decoder logic used during windowing operations. "X" represents a column address, and Z1–Z6 are states of the state machine that check the validity of the row or Y address for the window address as defined by microprocessor 3. For this configuration of windowing pixel matrix 2 has a rolling blade shutter, i.e., every pixel in a row is reset in sequence from the top to the bottom of pixel matrix 2. After resetting every pixel in a row and before the Y address is advanced to the next row, the state machine interrogates every pixel in that row to determine coincidence with a valid track window. After reading all pixels in a given row that coincide with the valid track window, the next row is reset and the interrogation process begins for the next row. Once the last row in the array is reached the state machine advances to the TRCV state. The TRCV state is used to hold the state machine until the track mode has been completed for a given frame. Once the TR flag becomes valid the ADL windowing state machine advances to the next frame by returning to the IDLE state.

Other flags of interest are the SOR (Start of Read) flag used to indicate the validity of the readout process of the array. Ti represents the timeout of integration time for the first state called "IDLE". T8 represents the timeout of the second state called "read reset".

In the read reset state, the state machine starts scanning for readout of valid track windows. Z window coordinates are window addresses provided by microprocessor 3. When the read reset state has completed resetting a row as outlined above, it begins scanning each row for coincidence with the Z window coordinates. If a row address is found that is coincident with the Z window address then column pixel data associated with the Z window address is readout. In the exemplary embodiment shown in FIG. 5, there are six Z window addresses, Z1–Z6, that can be scanned. Each Z window address is scanned for coincident column address one row at a time. In this manner when windows overlap in column space, the overlapping columns will be read out, repeating the process for each that fall in the Z window address. That is, microprocessor 3 provides six Z window addresses or more (although only six are shown in FIG. 5) in the row dimension or Y, and are stored in a Y address register 40. A Y counter 42 then increments through all row addresses. Each of these addresses is compared in an address comparator 41 to the Z window addresses stored in Y address register 40. If the row scanned produces a valid comparison between the two inputs of the address comparator 41 then the state machine progresses to a column readout sequence for that Z window address. An X address register 43 contains the valid X address for the Z track window that has been validated. X address register 43 loads an X address counter 44 for column decoder 5 with a preset so that X address counter 44 starts the readout of this row at the desired column and counts up to the end of the window address. The state machine of FIG. 5 progresses to the next Z window address and repeats the process for the next track window address contained in Y address register 40.

Figure 6:
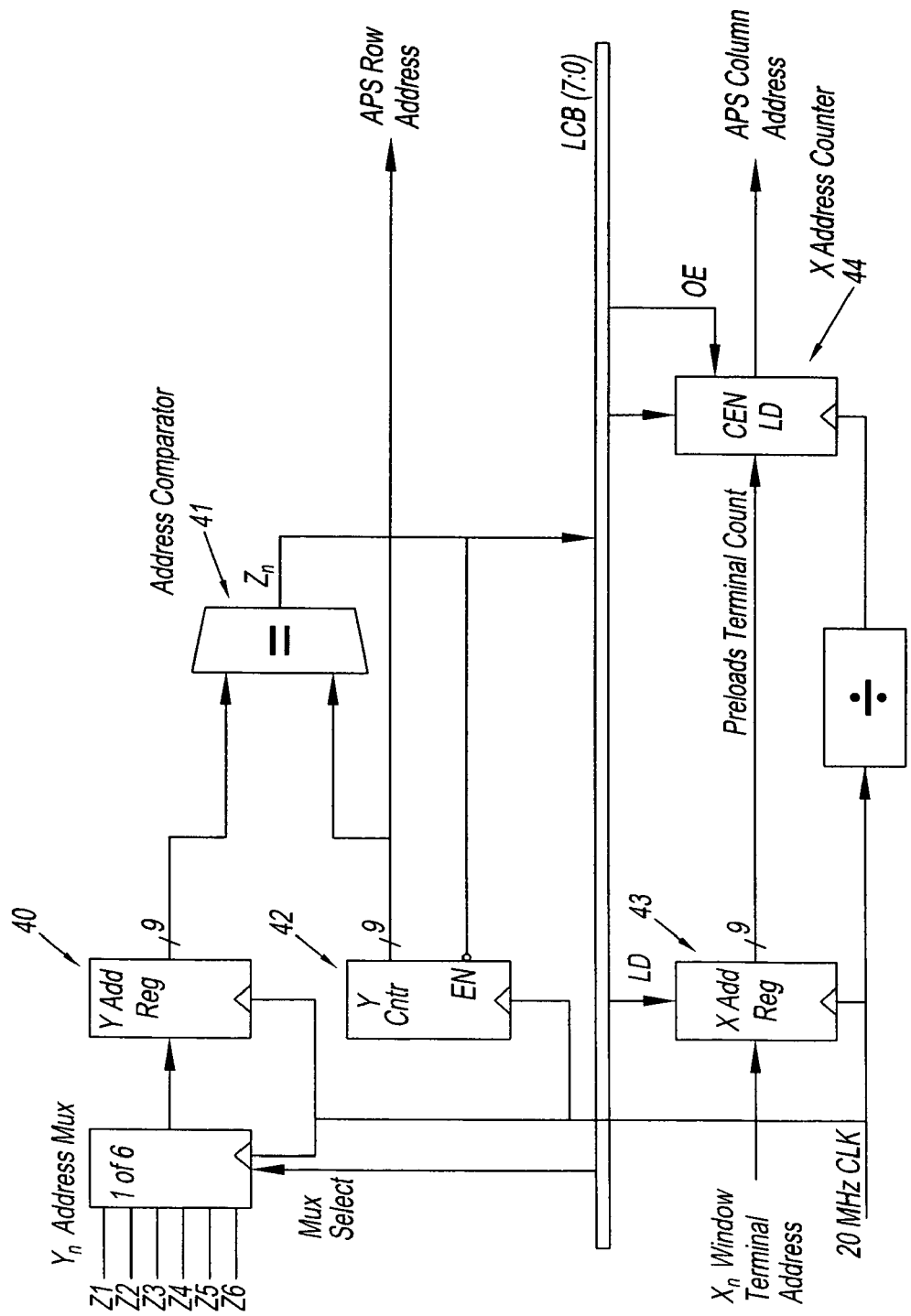
FIG. 6 is a block diagram of logic used during windowing operations in the accordance with present invention.

FIG. 6 is a functional block diagram of the logic that scans pixel matrix 2 by row for valid track windows.

In another embodiment of the present invention the integration time is selected for each window rather than globally for the entire pixel matrix 2. When doing this, additional logic is employed to control when each window is scanned, and non-destructive readouts are used to preserve the pixel charge in overlapping windows. Under this condition, an integration time is defined for each window by microprocessor 3 and is passed to RAIS 100 for setting each of six timers for integration time. When one of the six timers has reached its terminal count, the readout sequence for that window begins by setting row decoder 4 and column decoder 5, corresponding to the beginning pixel address of the window that has reached its terminal count. Each of the pixels within the defined window is then readout to a corresponding window buffer. At the end of this sequence the next window timer is inspected for its terminal count and the sequence will repeat. When all predefined windows have completed readout, the entire pixel matrix 2 is reset, which defines the beginning of a new integration time or a new frame for all track windows.

Figure 7:
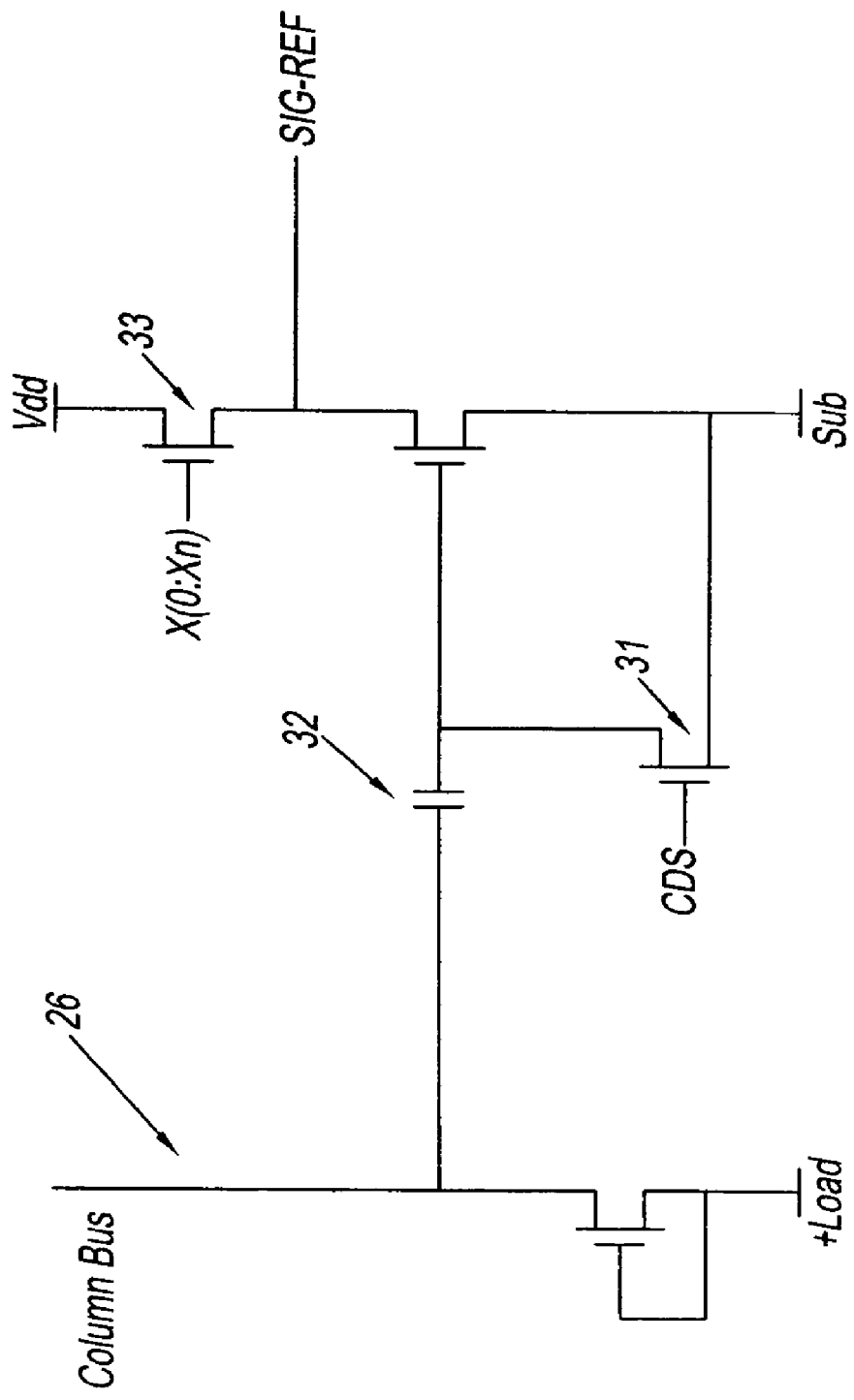
FIG. 7 is a schematic circuit diagram of an embodiment of output bus and correlated double sample circuitry of an active pixel sensor.
Figure 8:
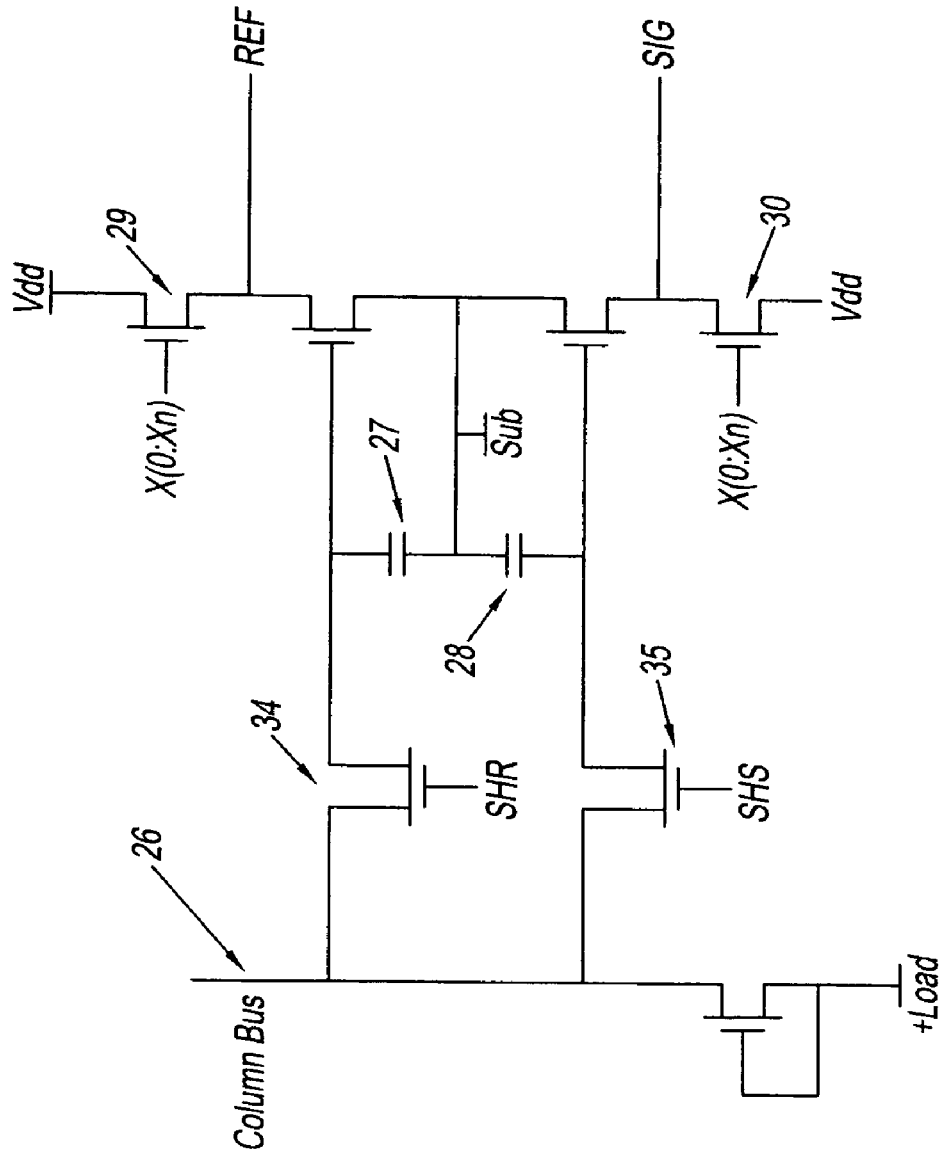
FIG. 8 is a schematic circuit diagram of another embodiment of output bus and correlated double sample circuitry of an active pixel sensor.

FIGS. 7 and 8 are schematic diagrams of an exemplary output bus and correlated double sample (CDS) circuits of an active pixel sensor. The circuits of FIG. 7 or 8 would be located within column amplifiers 50, shown in FIG. 1. These are different configurations for performing CDS of an active pixel sensor.

Figure 9:
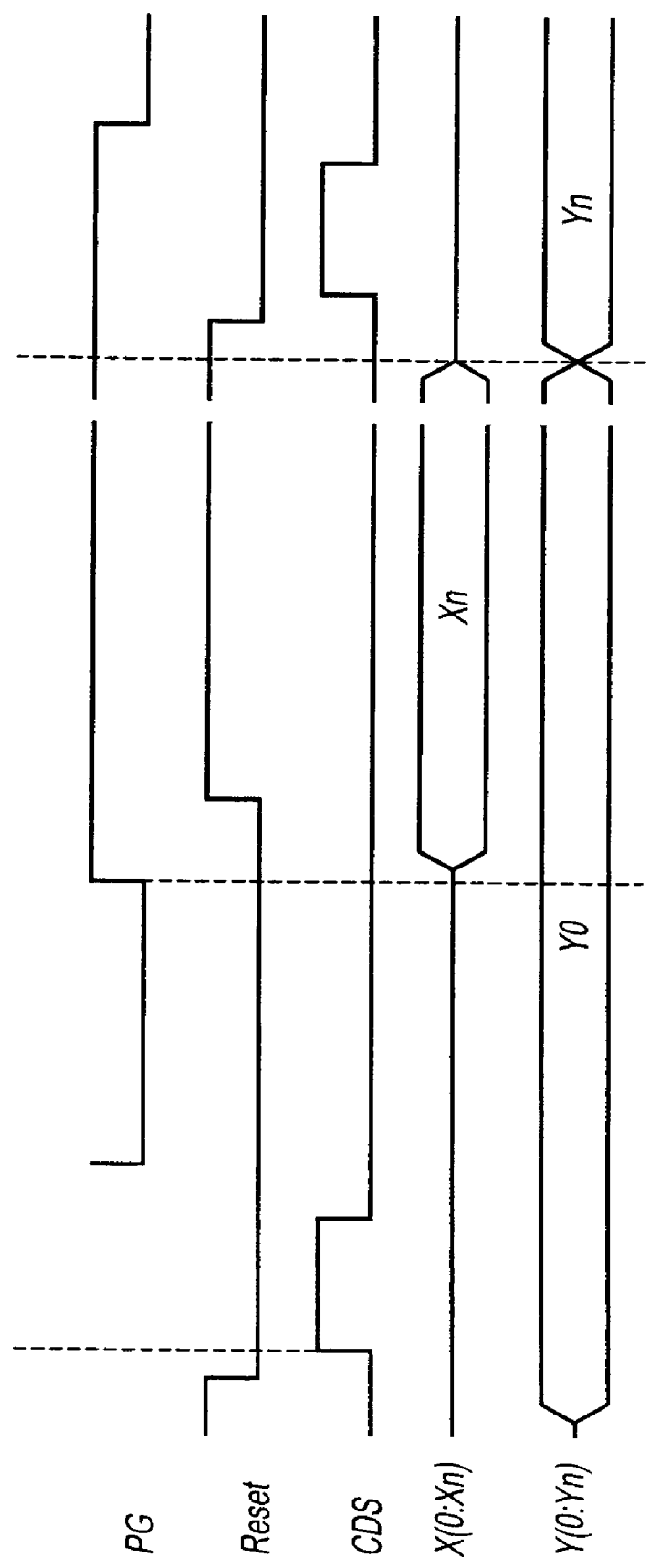
FIGS. 9 and 10 are read reset timing diagrams for a pixel in accordance with the present invention.
Figure 10:
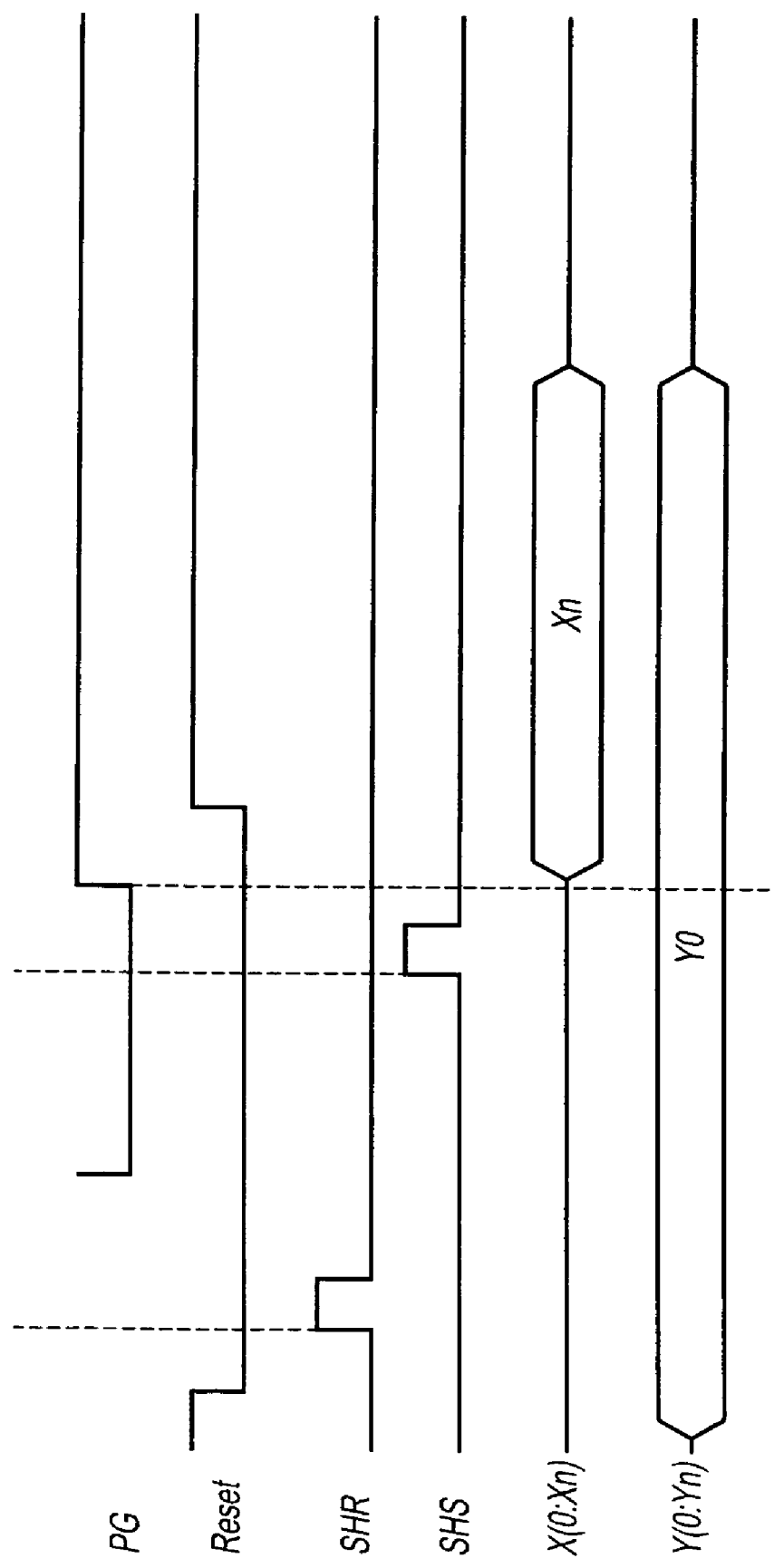

FIGS. 9 and 10 illustrate typical pixel timing for a pixel with a photogate present and having a column amplifier circuit topology as shown in FIGS. 7 and 8, respectively.

Referring to FIG. 9 and FIG. 2, a signal designated as PG is applied to the gate of photogate 10 of pixel matrix 2, and Reset is applied to the gate of transistor 22. During integration of the pixel, Reset is high, and the pixel is held Reset by transistor 22. Readout of the pixel occurs at the falling edge of PG, which corresponds with a low-level transition at photogate 10. Just prior to readout of the pixel, Reset is dropped, turning off reset transistor 22. This allows charge to be accumulated on floating diffusion 21. Just before photogate 10 is pulsed low (i.e., PG is pulsed low) allowing this charge to transfer from the pixel well or photosite 25, CDS is pulsed on. This turns on CDS transistor 31 (FIG. 7). When this happens, the residual charge (after resetting) on the floating diffusion 21 is sampled by capacitor 32 (FIG. 7). When capacitor 32 is released by turning off the CDS pulse (FIG. 9), capacitor 32 has been charged to the equivalent level of floating diffusion 21. Next the charge is transferred from photosite 25 to floating diffusion 21 by pulsing photogate 10 low. This places the charge on floating diffusion 21 of each pixel and this charge will then be ready for reading out through transistor 33 of each column amplifier 50. Photogate 10 can be selected by row and column discriminators within row decoder 4 and column decoder 5. This allows windowed integration time. If no such selection of columns is made within a row then the entire row will be sampled in this manner, in parallel to each of the column amplifiers 50.

FIG. 8 illustrates another topology of an exemplary output bus and correlated double sample (CDS) circuit of an active pixel sensor in column amplifier 50. This is a differential circuit used for sampling each pixel of the selected row and column. Here a sample hold reset (SHR) transistor 34 is turned on to sample the residual floating diffusion charge. That charge is stored on a capacitor 27. When the signal charge for the selected row and column pixel is transferred from the photosite 25 (FIG. 2) to the floating diffusion 21 (FIG. 2), a sample hold signal (SHS) 35 transistor is turned on and the charge is stored on a capacitor 28. During the readout period each of the selected column amplifiers are read out to a differential amplifier that is shared by the selection of column output transistors 29 and 30.

Referring again to FIG. 1, RAIS 100 enables microprocessor 3 to address pixel matrix 2 from with in the memory space of microprocessor 3 as microprocessor 3 does with any other peripheral, that is, by direct memory access. No large-scale external logic arrays are needed to operate pixel matrix 2, as would be required with conventional CCD technology. Instead, RAIS 100 sits on data bus 8 and address bus 9, and functions similarly to a random access memory in an ordinary microprocessor application. Thus, images from sensor array 105 appear in a memory map that may be analyzed under software control. This makes the software architecture much less complex than it is with traditional sensor arrays.

If a more specialized application is desired, microprocessor 3 may be imbedded in RAIS 100 along with firmware for the desired application.

In a "star tracker" application, RAIS 100 is employed for tracking a target such as a star or other body. Microprocessor 3 receives a scan of pixel matrix 2 for comparison to known data in a memory (not shown). Assuming that the target is a star, pixel charges of a desired star magnitude, i.e., brightness, may be identified to determine the column position of the star in a pixel image. Once this has been established a sub-frame of pixels or a "soft window" may be drawn around the star in two dimensions, i.e., in rows and columns, of photosites 25 within pixel matrix 2. Microprocessor 3 provides the start address and end address for a window to array decoder logic 6 through digital control interface 7 for read-out of the sub-frame of pixel matrix 2. After acquisition of a target, the target may be tracked across the field of view of pixel matrix 2.

Array decoder logic 6 accepts the sub-frame addresses for track windows from digital control interface 7 and provides row and column sequencing to drive row decoder 4 and column decoder 5 for the commanded readout of pixel matrix 2 in either acquisition mode or track mode.

The above description is but one of several ways to implement a star tracking application in the context of RAIS 100. In addition, different active pixel designs may require alteration to the specific circuitry and operation of the software. The architecture of RAIS 100 provides flexibility in applications without sacrificing compatibility with various active pixel sensors and microprocessor designs.

Since the output data of RAIS 100 is mapped into an address space of microprocessor 3 as memory, and since RAIS 100 includes array decoder logic 6 and appropriate clock references, RAIS 100 can be completely controlled by software. An example of software used for tracking moving images is a high level state machine referred to as software control logic (SCL), and is designed to control all the star tracker functions while allowing flexibility in readout and pixel data processing. The number of tracked images is a function of the number of SCLs running in microprocessor 3 and is dependent on processing speed and power.

Figure 11:
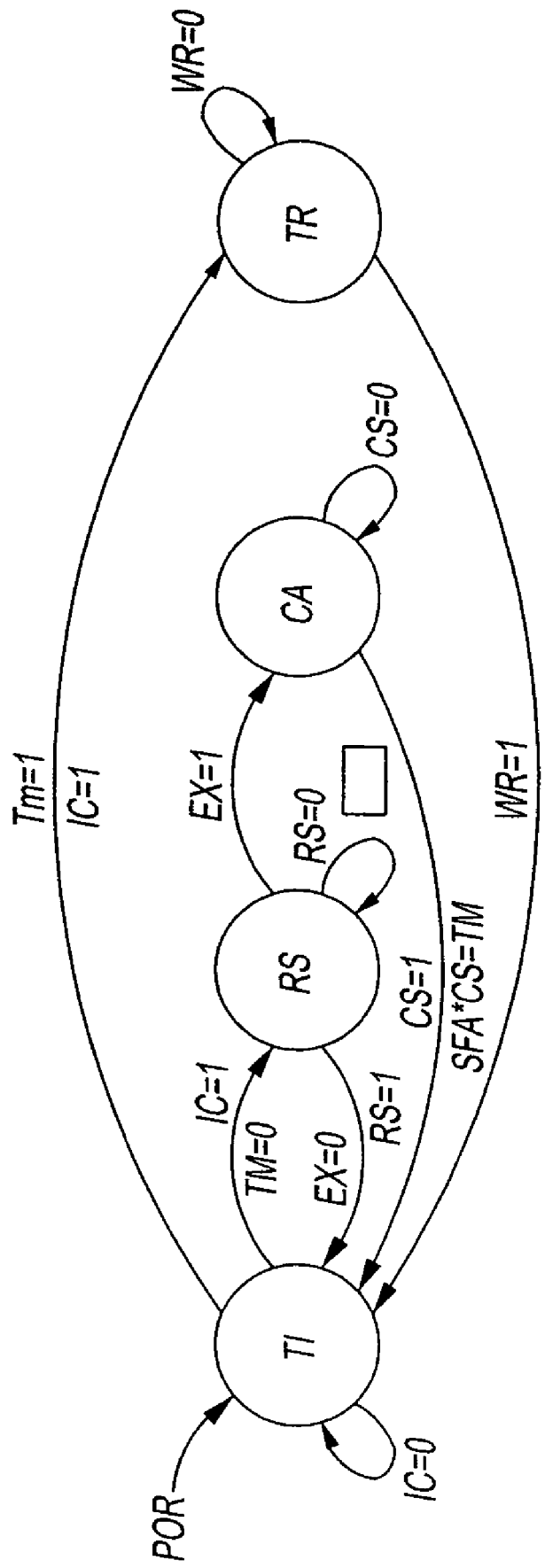
FIG. 11 is a state diagram of a software state machine for tracking moving images, as may be employed by a microprocessor application in accordance with the present invention.

FIG. 11 is a state diagram of a software state machine for a single SCL. The SCL consists of two modes and four states. The modes are acquisition mode (AM) and track mode (TM). The states are integration time (TI), row scan (RS), column acquisition (CA) and track (TR). The flags used to advance the state machine are POR, TM, IC, EX, CS, and WR. POR is Power on Reset and causes the state machine to start at TI state after initializing the power to the system. TM is Track Mode and is one of two modes as described above. IC is the integration time counter and is set at the beginning of TI state at a software programmable value. EX is a flag used in the row scan state to indicate when a row has exceeded the software programmable threshold. CS is column scan and is a flag used to indicate when the readout of the software programmable columns is complete. WR is a flag used to determine when a particular target window has been readout. When this flag goes true the machine starts a new integration time for that SCL window. Upon the application of a Power on Reset (POR) the SCL returns to the TI state.

In the TI state, and more particularly every time the SCL enters the TI state, two address words are output from the tracking algorithm to update the window coordinates for pixel matrix 2. The window address is composed of two 24 bit binary numbers that are proportional to the windows starting and ending pixel addresses. These addresses are repeated or updated upon entry to the TR state. This is done for the direct addressing mode, where an integration period sub-frame may be different than the single pixel readout produced by direct addressing. The track window or sub-frame can be any dimension from 1×1 up to the dimensions of pixel matrix 2, with the latter yielding a full frame output rather than window. Overlap of windows can be handled through special logic in the hardware of RAIS 100.

If, for example, a star is being tracked and it traverses into a window with a different integration time, that star would be lost. In this case, the software will work off alternate integration periods to continue tracking through the window. This is a special case and will not occur when the star tracker is tracking only stars. This is because prior knowledge of the location of the star being tracked will not allow it to traverse into a different window of a star being tracked with a different integration time.

Microprocessor 3 can manage a first sub-frame of sensor array 105 and a second sub-frame of sensor array 105 where the first sub-frame has a first integration time and the second sub-frame has a second integration time. Also, the first sub-frame and the second sub-frame may overlap one another.

Although the present description relates to a selection of up to six sub-frames or track windows, it is possible to configure a window for every pixel in the array. The ability to select individual window integration periods allows the sensor array system to handle wide dynamic ranges over the full field of view of pixel matrix 2.

An integration time counter (IC) resides in software and is controlled by a software programmable delay set for a desired integration period. While IC is low the machine dwells in the TI state. The next clock cycle after IC goes true the state machine advances to RS.

In the RS state, Acquisition Mode (AM) is operational. RAIS interface 110 scans through sensor array 105 to locate a row that includes a target, or a portion of the target. In the RS state, only the row address is given to digital control interface 7. Array decoder logic 6 enables all columns of that row, and all pixels within the row are summed together. The data is then compared to a programmable threshold set to a level commensurate with a target signal compatible with the co-addition of all the columns of a row and only flagged if the data exceeds this threshold. If the during the row scan (RS) the threshold is exceeded (EX=1), the row number is stored and the SCL state machine repeats the row scan to eliminate the possibility of transient events. If EX remains set to one, then the SCL state machine advances to the CA state at the completion of the row scan (RS=1). Upon termination of the row scan counter, the RS flag goes true and if no signal exceeded (EX=0) the threshold in the entire scan, the state machine returns to TI to begin a new integration period.

In the CA state, RAIS interface 110 progresses through columns of sensor array 105 to locate the target. Upon entering the CA state, a column counter, which is software programmable to the number of columns in the array, starts counting down looking for pixel charges in excess of a new threshold set to a level appropriate for a single star. After mapping the columns with excesses in a given row, a window address (SFA) is produced and TM mode is initiated. If no excesses occur, TM mode would not be set and the state machine returns to the TI state, but remains in the AM mode, processing another acquisition cycle. The state machine remains in AM mode until a valid TM mode is produced. If TM mode is set, the state machine returns to the TI state to begin a new integration period. This is found by the Boolean expression:

SFA•CS=TM

CS is defined as a flag for controlling the state machine. This flag goes true when the last column of a row has been scanned. TI is executed and a readout of the window is begun upon entering the TR state. TI is the state where the integration time is set for a new frame. So after CA a new TI is executed and since CA found a valid star now the track mode TR, is entered. The track window address is passed to digital control interface 7 for interpretation by array decoder logic 6. Upon termination of a Window Read counter (WR) the SFA is incremented and the state machine advances to the TI state for a new integration period. If at this time TM is still 1, then at the completion of the TI state, the state machine advances to the TR state again for another track window readout. If, however, track was lost during the previous TR state, TM would have gone to 0 and a new acquisition sequence would begin as defined above unless the SCL had been turned off for that track window. In that case the SCL would remain in its reset condition and would not output address words. Each track window has its own SCL operating in identical fashion to the description above. Integration periods for each window can be commanded at once, one SCL then the next SCL and so forth. Readout of the windows in the TR state must be handled sequentially. So, if a window is being read out, the next window must not be read out until completion of its predecessor. In the case of overlapping window addresses, these are passed to array decoder logic 6 so a flag can be set to issue non-destructive readouts at the pixels that would overlap in a given track window. A non-destructive readout does not reset the given pixel in pixel matrix 2 when that row is addressed.

Thus, an integrated circuit semiconductor chip is constructed having an active pixel sensor array. Each pixel may be independently addressed and reset, driven by a single set of row and column decoders. Array logic provides sequencing instructions to the decoders to scan the array for target discrimination. There is also a capability for correcting gain and offset deficiencies at an individual pixel during readout of the sensor array. A digital control interface receives the digital output data from the sensor array and can be handled through direct memory accesses of a microprocessor. The integrated circuit enables the microprocessor to address the sensor array from with in the memory space of the microprocessor.

While herein are described several embodiments in accordance with the present invention, it is to be clearly understood that the same are susceptible to numerous changes apparent to one skilled in the art. Therefore, the invention is not to be regarded as being limited to the details shown and described herein, but is intend to encompass all changes and modifications that fall within the scope of the appended claims.

What is claimed is:

1. A circuit comprising:
    a decoder for receiving a memory address within a memory address space of a processor, and converting said memory address into a row signal to drive a row of an active pixel sensor array, and a column signal to drive a column of said active pixel sensor array, wherein said row signal and said column signal designate a position of a pixel in said active pixel sensor array.

2. The circuit of claim 1, further comprising:
    a module for receiving a start address and an end address that designates a portion of said active pixel sensor array,
    wherein said module uses said start address and said end address to present a sequence of addresses that said decoder uses to sequentially access a plurality of pixels in said portion.

3. The circuit of claim 1, further comprising a module for correcting for a condition selected from the group consisting of: an offset of said pixel, and a gain of said pixel.

4. The circuit of claim 1,
    wherein said active pixel sensor array senses an image, and
    wherein said circuit is employed for tracking a target in said image.

5. The circuit of claim 4, wherein said target is a star.

6. The circuit of claim 1,
    wherein said pixel is one of a plurality of pixels in said active pixel sensor array, and
    wherein said circuit provides a signal to simultaneously extract charges from said plurality of pixels.

7. The circuit of claim 6, wherein said plurality of pixels form a row of pixels in said active pixel sensor array.

8. The circuit of claim 6, wherein said charges are added together to yield a sum.

9. The circuit of claim 8, further comprising a module for comparing said sum to a threshold value to determine whether a target image is represented by said plurality of pixels.

10. The circuit of claim 1, wherein said decoder maps said active pixel sensor array to said memory address space.

11. The circuit of claim 1, wherein said decoder employs said row signal and said column signal to access said pixel.

12. An integrated circuit, comprising:
    an active pixel sensor array, and
    a decoder for receiving a memory address within a memory address space of a processor, converting said memory address into a row signal to drive a row of an active pixel sensor array, and a column signal to drive a column of said active pixel sensor array, wherein said row signal and said column signal designate a position of a pixel in said active pixel sensor array, and accessing said pixel based on said row signal and said column signal,
    wherein said decoder maps said active pixel sensor array to said memory address space.

13. The integrated circuit of claim 12, further comprising a converter for representing a charge read from said pixel as a digital value.

14. The integrated circuit of claim 12, wherein said active pixel sensor array is configured of complementary metal oxide semiconductor (CMOS) devices.

15. The integrated circuit of claim 12, further comprising a module for receiving a start address and an end address that designates a portion of said active pixel sensor array, wherein said module uses said start address and said end address to present a sequence of addresses to said decoder to access pixels in said portion.

16. The integrated circuit of claim 12, further comprising a module to correct for a condition selected from the group consisting of: an offset of said pixel, and a gain of said pixel.

17. The integrated circuit of claim 12, further comprising an amplifier for amplifying a charge read from said pixel.

18. The integrated circuit of claim 12, wherein said pixel comprises an electron well and a gate to control integration time over said electron well.

19. The integrated circuit of claim 12, wherein said pixel comprises a photodiode to collect a charge.

20. The integrated circuit of claim 12, wherein said active pixel sensor array senses an image, and wherein said integrated circuit is employed for tracking a target in said image.

21. The integrated circuit of claim 20, wherein said target is a star.

22. A system comprising:
an active pixel sensor array;
a decoder for receiving a memory address, converting said memory address into a row signal to drive a row of an active pixel sensor array, and a column signal to drive a column of said active pixel sensor array, wherein said row signal and said column signal designate a position of a pixel in an active pixel sensor array, and accessing said pixel of said active pixel sensor array based on said row signal and said column signal;
a converter for representing a charge read from said pixel as a digital value; and
a microprocessor for providing said memory address and receiving said digital value,
wherein said memory address is within a memory address space of said microprocessor, and
wherein said decoder maps said active pixel sensor array to said memory address space.

23. The system of claim 22, wherein said active pixel sensor array is configured of complementary metal oxide semiconductor (CMOS) devices.

24. The system of claim 22,
wherein said microprocessor provides a start address and an end address that designates a portion of said active pixel sensor array, and
wherein said system further comprises a module that uses said start address and said end address to present a sequence of addresses to said decoder to access pixels in said portion.

25. The system of claim 22, further comprising a module to correct for a condition selected from the group consisting of: an offset of said pixel, and a gain of said pixel.

26. The system of claim 22, further comprising an amplifier for amplifying a charge read from said pixel.

27. The system of claim 22, wherein said active pixel sensor array senses an image, and said system is employed for tracking a target in said image.

28. The system of claim 27, wherein said target is a star.

29. The system of claim 22, wherein said pixel wherein said microprocessor controls an integration time for a window that includes said pixel.

30. The system of claim 22, wherein said microprocessor controls an integration time on a group of pixels of said active pixel sensor array.

31. The system of claim 22, wherein said microprocessor addresses a sub-frame of view region of said active pixel sensor array.

32. The system of claim 22, wherein said microprocessor manages a first sub-frame of said active pixel sensor array and a second sub-frame of said active pixel sensor array.

33. The system of claim 32, wherein said first sub-frame has a first integration time and said second sub-frame has a second integration time.

34. The system of claim 32, wherein said first and second sub-frame of view regions overlap one another.

* * * * *